(12) United States Patent
Shinoda et al.

(10) Patent No.: US 8,855,857 B2
(45) Date of Patent: *Oct. 7, 2014

(54) ELECTRIC MOTOR CONTROLLER AND ELECTRIC MOTOR CONTROLLER FOR VEHICLE STEERING APPARATUS

(75) Inventors: Satoshi Shinoda, Neyagawa (JP); Yoshinobu Shimizu, Sakai (JP)

(73) Assignee: JTEKT Corporation, Osaka-shi (JP)

( * ) Notice: Subject to any disclaimer, the term of this patent is extended or adjusted under 35 U.S.C. 154(b) by 440 days.

This patent is subject to a terminal disclaimer.

(21) Appl. No.: 12/696,604

(22) Filed: Jan. 29, 2010

(65) Prior Publication Data

US 2010/0198462 A1  Aug. 5, 2010

(30) Foreign Application Priority Data

Jan. 30, 2009  (JP) ................................. 2009-019976

(51) Int. Cl.
*B62D 5/04* (2006.01)
*B62D 5/14* (2006.01)
*H02P 21/02* (2006.01)

(52) U.S. Cl.
CPC ................ *H02P 21/02* (2013.01); *B62D 5/046* (2013.01); *B62D 5/0463* (2013.01)
USPC ............................... 701/41; 701/42; 180/443

(58) Field of Classification Search
CPC ...................................................... B62D 5/046
USPC ............... 701/41–42; 180/412–423, 443–447
See application file for complete search history.

(56) References Cited

U.S. PATENT DOCUMENTS

| | | |
|---|---|---|
| 5,513,720 A | 5/1996 | Yamamoto et al. |
| 5,568,389 A | 10/1996 | McLaughlin et al. |
| 5,928,298 A | 7/1999 | Matsuoka et al. |
| 6,364,051 B1 | 4/2002 | Kada et al. |
| 6,396,229 B1 | 5/2002 | Sakamoto et al. |
| 6,397,969 B1 | 6/2002 | Kasai et al. |
| 6,781,333 B2 | 8/2004 | Koide et al. |
| 7,076,340 B1 | 7/2006 | Inazumi et al. |
| 2002/0026270 A1 | 2/2002 | Kurishige et al. |
| 2002/0180402 A1* | 12/2002 | Koide et al. ................... 318/727 |
| 2003/0030404 A1* | 2/2003 | Iwaji et al. ..................... 318/700 |
| 2004/0267421 A1 | 12/2004 | Eskritt et al. |
| 2005/0029972 A1 | 2/2005 | Imai et al. |
| 2005/0257994 A1 | 11/2005 | Fujita |

(Continued)

FOREIGN PATENT DOCUMENTS

| | | |
|---|---|---|
| EP | 1 487 098 A1 | 12/2004 |
| EP | 1 955 926 A2 | 8/2008 |

(Continued)

OTHER PUBLICATIONS

U.S. Appl. No. 12/823,573, filed Jun. 25, 2010.

(Continued)

*Primary Examiner* — Helal A Algahaim
*Assistant Examiner* — Charles J Han
(74) *Attorney, Agent, or Firm* — Oliff PLC

(57) ABSTRACT

An electric motor controller for controlling an electric motor that includes a rotor and a stator that faces the rotor. The electric motor controller includes a current drive unit; an addition angle calculation unit; a control angle calculation unit; a torque detection unit; a changing unit and a suspending unit.

14 Claims, 10 Drawing Sheets

(56) References Cited

U.S. PATENT DOCUMENTS

| | | | |
|---|---|---|---|
| 2005/0273236 A1* | 12/2005 | Mori et al. ..................... 701/41 |
| 2006/0086561 A1 | 4/2006 | Hidaka |
| 2006/0090954 A1 | 5/2006 | Sugitani et al. |
| 2006/0125439 A1 | 6/2006 | Ajima et al. |
| 2007/0040528 A1 | 2/2007 | Tomigashi et al. |
| 2007/0229021 A1 | 10/2007 | Yoshida et al. |
| 2007/0273317 A1 | 11/2007 | Endo et al. |
| 2007/0284181 A1* | 12/2007 | Muranaka ..................... 180/446 |
| 2008/0035411 A1 | 2/2008 | Yamashita et al. |
| 2008/0047775 A1 | 2/2008 | Yamazaki |
| 2008/0128197 A1 | 6/2008 | Kawaguchi et al. |
| 2008/0201041 A1* | 8/2008 | Jiang ............................... 701/42 |
| 2009/0069979 A1* | 3/2009 | Yamashita et al. ............. 701/42 |
| 2009/0240389 A1* | 9/2009 | Nomura et al. ................. 701/29 |
| 2010/0057300 A1 | 3/2010 | Nishiyama |
| 2010/0094505 A1 | 4/2010 | Kariatsumari et al. |
| 2010/0198462 A1 | 8/2010 | Shinoda et al. |
| 2010/0263709 A1 | 10/2010 | Norman et al. |
| 2011/0035114 A1 | 2/2011 | Yoneda et al. |
| 2012/0080259 A1* | 4/2012 | Ueda et al. ..................... 180/446 |

FOREIGN PATENT DOCUMENTS

| | | |
|---|---|---|
| EP | 2 086 106 A2 | 8/2009 |
| EP | 2 159 133 A1 | 3/2010 |
| EP | 2 177 422 A2 | 4/2010 |
| EP | 2 216 895 A2 | 8/2010 |
| JP | A 4-161085 | 6/1992 |
| JP | A 6-305436 | 11/1994 |
| JP | A 9-226606 | 9/1997 |
| JP | A 10-76960 | 3/1998 |
| JP | A 10-243699 | 9/1998 |
| JP | A 2000-050689 | 2/2000 |
| JP | A 2001-37281 | 2/2001 |
| JP | A 2001-251889 | 9/2001 |
| JP | A 2002-359996 | 12/2002 |
| JP | A 2003-125594 | 4/2003 |
| JP | A-2003-182620 | 7/2003 |
| JP | A 2007-53829 | 3/2007 |
| JP | A 2007-267549 | 10/2007 |
| JP | A-2007-267549 | 10/2007 |
| JP | A 2008-24196 | 2/2008 |
| JP | A 2008-087756 | 4/2008 |
| JP | A 2009-124811 | 6/2009 |
| JP | A 2010-178549 | 8/2010 |
| WO | WO 2007/139030 A1 | 12/2007 |
| WO | WO 2009/138830 A1 | 11/2009 |

OTHER PUBLICATIONS

U.S. Appl. No. 12/943,514, filed Nov. 10, 2010.
U.S. Appl. No. 13/685,152, filed Nov. 26, 2012.
U.S. Appl. No. 12/945,101, filed Nov. 12, 2010.
U.S. Appl. No. 12/946,187, filed Nov. 15, 2010.
U.S. Appl. No. 13/205,138, filed Aug. 8, 2011.
U.S. Appl. No. 12/997,168, filed Dec. 9, 2010.
Feb. 6, 2014 Office Action issued in U.S. Appl. No. 12/823,573.
Sep. 5, 2013 Office Action issued in U.S. Appl. No. 12/823,573.
Mar. 21, 2013 Office Action issued in U.S. Appl. No. 12/823,573.
Dec. 10, 2012 Office Action issued in U.S. Appl. No. 12/823,573.
Jun. 19, 2012 Office Action issued in U.S. Appl. No. 12/823,573.
Nov. 7, 2013 Office Action issued in U.S. Appl. No. 13/685,152.
Jul. 17, 2013 Office Action issued in U.S. Appl. No. 13/685,152.
Feb. 12, 2014 Office Action issued in U.S. Appl. No. 12/945,101.
Nov. 28, 2013 Office Action issued in Japanese Patent Application No. 2009-258962 (with translation).
Jul. 19, 2013 Office Action issued in U.S. Appl. No. 12/945,101.
Mar. 26, 2013 Office Action issued in U.S. Appl. No. 12/945,101.
Dec. 11, 2012 Office Action issued in U.S. Appl. No. 12/945,101.
Aug. 9, 2012 Office Action issued in U.S. Appl. No. 12/945,101.
Feb. 6, 2014 Office Action issued in U.S. Appl. No. 12/946,187.
Sep. 10, 2013 Office Action issued in U.S. Appl. No. 12/946,187.
Jul. 15, 2013 Office Action issued in U.S. Appl. No. 12/946,187.
Sep. 19, 2012 Office Action issued in U.S. Appl. No. 12/946,187.
Feb. 11, 2014 Office Action issued in U.S. Appl. No. 13/205,138.
Sep. 5, 2013 Office Action issued in U.S. Appl. No. 13/205,138.
Mar. 20, 2013 Office Action issued in U.S. Appl. No. 13/205,138.
Sep. 19, 2012 Search Report issued in European Patent Application No. 11177780.1.
Sep. 10, 2012 Office Action issued in U.S. Appl. No. 13/205,138.
Feb. 6, 2014 Office Action issued in U.S. Appl. No. 12/997,168.
Sep. 10, 2013 Office Action issued in U.S. Appl. No. 12/997,168.
Mar. 25, 2013 Office Action issued in U.S. Appl. No. 12/997,168.
Aug. 14, 2012 Office Action issued in U.S. Appl. No. 12/997,168.
Feb. 10, 2014 Office Action issued in U.S. Appl. No. 12/943,514.
Sep. 10, 2013 Office Action issued in U.S. Appl. No. 12/943,514.
Aug. 31, 2012 Office Action issued in U.S. Appl. No. 12/943,514.
Feb. 8, 2011 International Preliminary Report on Patentability issued in International Patent Application No. PCT/JP2009/002991 (with translation).
Oct. 6, 2009 Search Report issued in International Patent Application No. PCT/JP2009/002991 (with translation).
May 22, 2014 Office Action issued in Japanese Patent Application No. 2010-186220 (with translation).
Jun. 8, 2011 Extended Search Report issued in European Patent Application No. 10191142.8.
Jul. 20, 2010 Search Report issued in European Patent Application No. 10156226.
May 24, 2012 Office Action issued in U.S. Appl. No. 12/721,855.

* cited by examiner

ELECTRIC MOTOR CONTROLLER AND ELECTRIC MOTOR CONTROLLER FOR VEHICLE STEERING APPARATUS

INCORPORATION BY REFERENCE

The disclosure of Japanese Patent Application No. 2009-019976 filed on Jan. 30, 2009 including the specification, drawings and abstract is incorporated herein by reference in its entirety.

BACKGROUND

The invention relates to an electric motor controller and an electric motor controller for a vehicle steering apparatus.

A brushless motor is used as a drive source that supplies a driving force to, for example, a vehicle steering apparatus. An example of the vehicle steering apparatus is an electric power steering apparatus. An electric motor controller that controls driving of the brushless motor is usually configured to control the electric current that is supplied to the motor based on the output from a rotational angle sensor that detects the rotational angle of a rotor. As the rotational angle sensor, a resolver that outputs a sine-wave signal and a cosine-wave signal that correspond to the rotational angle (electrical angle) of a rotor is usually used. However, the resolver is expensive, and needs a large number of wires and a large installation space. Therefore, using the resolver as the rotational angle sensor hinders reduction in cost and size of a unit that includes the brushless motor.

U.S. Patent Application Publication No. 2007/0229021 A1 describes a sensorless drive method for driving a brushless motor without using a rotational angle sensor. According to the sensorless drive method, the induced voltage that varies depending on the rotational speed of a rotor is estimated in order to estimate the phase of a magnetic pole (electrical angle of the rotor). When the rotor is at a standstill or rotating at a considerably low speed, it is not possible to estimate the induced voltage. Therefore, the phase of the magnetic pole is estimated by another method. More specifically, a sensing signal is input in a stator, and a response of the motor to the sensing signal is detected. Then, the rotational position of the rotor is estimated based on the response of the motor.

SUMMARY

According to an exemplary aspect of the disclosure, an electric motor controller and an electric motor controller for a vehicle steering apparatus are provided in which an electric motor is controlled by a new control method that does not require a rotational angle sensor.

An exemplary aspect of the disclosure relates to an electric motor controller for controlling an electric motor that includes a rotor and a stator that faces the rotor. A current drive unit drives the motor based on an axis current value in a rotating coordinate system that rotates in accordance with a control angle that is a rotational angle used in a control, An addition angle calculation unit calculates an addition angle that is added to the control angle. A control angle calculation unit obtains a current value of the control angle by adding the addition angle to an immediately preceding value of the control angle in each predetermined calculation cycle. A torque detection unit detects a torque that is applied to a motor driven member except a motor torque. A changing unit changes a parameter for controlling the electric motor in accordance with a detected torque that is detected by the torque detection unit. A suspending unit suspends the operation of the changing unit, until an absolute value of the detected torque becomes equal to or smaller than a predetermined value.

BRIEF DESCRIPTION OF THE DRAWINGS

The foregoing and further features and advantages will become apparent from the following description of example embodiments with reference to the accompanying drawings, wherein like numerals are used to represent like elements and wherein.

DETAILED DESCRIPTION OF EMBODIMENTS

Figure 1:
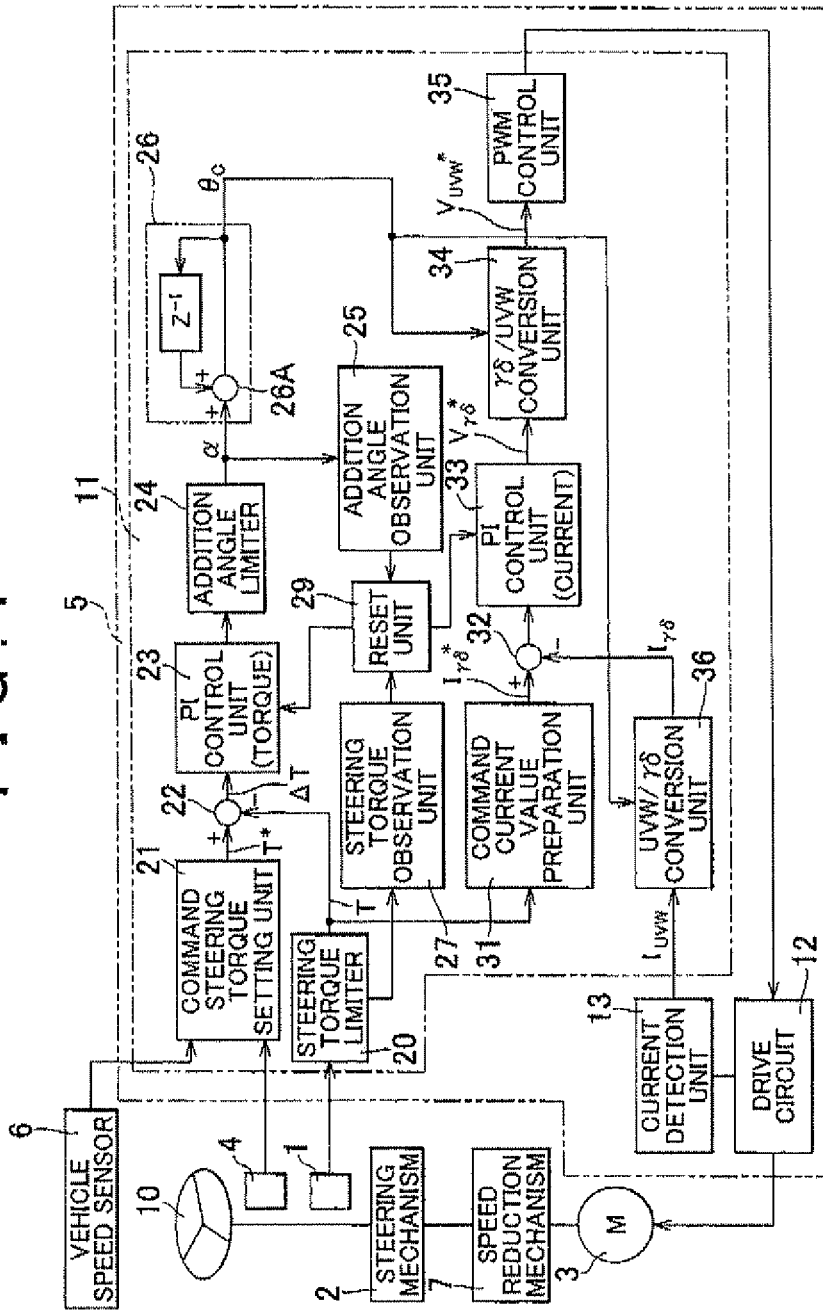
FIG. 1 is a block diagram illustrating the electrical configuration of an electric power steering apparatus used as an electric motor controller according to a first embodiment of the invention.

Hereafter, exemplary embodiments of the invention will be described with reference to the accompanying drawings. FIG. 1 is a block diagram illustrating the electrical configuration of an electric motor controller used as an electric power steering apparatus (an example of a vehicle steering apparatus) according to a first embodiment of the invention. The electric power steering apparatus includes a torque sensor 1 that detects the steering torque T that is applied to a steering wheel 10 that serves as an operation member used to steer a vehicle, an electric motor 3 (brushless motor) that applies a steering assist force to a steering mechanism 2 of the vehicle via a speed reduction mechanism 7, a steering angle sensor 4 that detects the steering angle that is the rotational angle of the steering wheel 10, an electric motor control unit 5 that controls driving of the motor 3, and a vehicle speed sensor 6 that detects the speed of the vehicle in which the electric power steering apparatus is mounted. The torque sensor 1 is an example of a torque detection unit 1. The steering mechanism 2 is a motor driven member.

The motor control unit 5 controls driving of the motor 3 based on the steering torque detected by the torque sensor 1, the steering angle detected by the steering angle sensor 4, and the vehicle speed detected by the vehicle speed sensor 6, thereby providing appropriate steering assistance based on the steering state and the vehicle speed.

Figure 2:
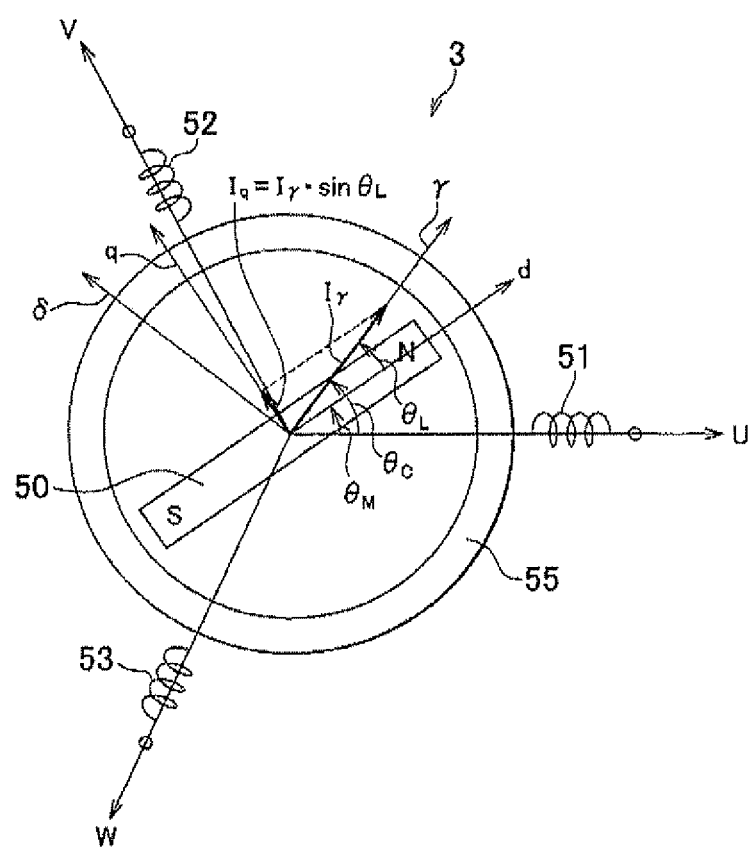
FIG. 2 is a view illustrating the configuration of the motor.

In the first embodiment, the motor 3 is a three-phase brushless motor. As illustrated in FIG. 2, the motor 3 includes a rotor 50 that serves as a field magnet, and a U-phase stator coil 51, a V-phase stator coil 52, and a W-phase stator coil 53 that are arranged on a stator 55 that faces the rotor 50. The motor 3 may be an inner rotor motor in which a stator is arranged on the outer side of a rotor so as to face the rotor, or an outer rotor motor in which a stator is arranged on the inner side of a tubular rotor so as to face the rotor.

A three-phase fixed coordinate system (UVW coordinate system), where the direction in which the U-phase stator coil 51 extends, the direction in which the V-phase coil 52 extends, and the direction in which the W-phase coil 53 extends are used as the U-axis, the V-axis and W-axis, respectively, is defined. In addition, a two-phase rotating coordinate system (dq coordinate system: actual rotating coordinate system), where the direction of the magnetic poles of the rotor 50 is used as the d-axis (axis of the magnetic poles) and the direction that is perpendicular to the d-axis within the rotary plane of the rotor 50 is used as the q-axis (torque axis), is defined. The dq coordinate system is a rotating coordinate system that rotates together with the rotor 50. In the dq coordinate system, only the q-axis current contributes to generation of torque by the rotor 50. Therefore, the d-axis current may be set to 0 and the q-axis current may be controlled based on a desired torque. The rotational angle (rotor angle) θM of the rotor 50 is a rotational angle of the d-axis with respect to the U-axis. The dq coordinate system is an actual rotating coordinate system that rotates in accordance with the rotor angle θM. With the use of the rotor angle θM, coordinate conversion may be made between the UVW coordinate system and the dq coordinate system.

In the first embodiment, the control angle θC that indicates the rotational angle used in the control is employed. The control angle θC is an imaginary rotational angle with respect to the U-axis. An imaginary two-phase rotating coordinate system (γδ coordinate system: hereinafter, referred to as "imaginary rotating coordinate system", the coordinate axis of the imaginary rotating coordinate system will be referred to as "imaginary axis", and the axis current value of the imaginary axis will be referred as "imaginary axis current value"), where the imaginary axis that forms the control angle θC with the U-axis is used as the γ-axis, and the axis that is advanced 90 degrees from the γ-axis is used as the δ-axis, is defined. When the control angle θC is equal to the rotor angle θM, the γδ coordinate system, which is the imaginary rotating coordinate system, and the dq coordinate system, which is the actual rotating coordinate system, coincides with each other. That is, the γ-axis, which is the imaginary axis, coincides with the d-axis, which is the actual axis, and the δ-axis, which is the imaginary axis, coincides with the q-axis, which is the actual axis. The γδ coordinate system is an imaginary rotating coordinate system that rotates in accordance with the control angle θC. Coordinate conversion may be made between the UVW coordinate system and the γδ coordinate system with the use of the control angle θC.

The load angle θL (=θC−θM) is defined based on the difference between the control angle θC and the rotor angle θM. When the γ-axis current Iγ is supplied to the motor 3 based on the control angle θC, the q-axis component of the γ-axis current Iγ (orthogonal projection to the q-axis) is used as the q-axis current Iq that contributes to generation of torque by the rotor 50. That is, the relationship expressed by Equation 1 is established between the γ-axis current Iγ and the q-axis current Iq.

$$Iq \times I\gamma \times \sin \theta L \qquad \text{Equation 1}$$

Referring again to FIG. 1, the motor control unit 5 includes a microcomputer 11, a drive circuit (inverter circuit) 12 that is controlled by the microcomputer 11 and that supplies electric power to the motor 3, and a current detection unit 13 that detects an electric current that flows through the stator coil of each phase of the motor 3.

The current detection unit 13 detects the U-phase current IU, the V-phase current IV and the W-phase current IW that flow through the U-phase stator coil 51, the V-phase stator coil 52, and the W-phase stator coil 53 of the motor 3, respectively, (these phase currents will be collectively referred to as "three-phase detected current IUVW" where appropriate). The U-phase current IU, the V-phase current IV and the W-phase current IW are the current values in the directions of the axes of the UVW coordinate system.

The microcomputer 11 includes a CPU and memories (a ROM, a RAM, etc.), and serves as multiple function processing units by executing predetermined programs. The multiple function processing units include a steering torque limiter 20, a command steering torque setting unit 21, a torque deviation calculation unit 22, a PI (proportional integral) control unit 23, an addition angle limiter 24, an addition angle observation unit 25, a control angle calculation unit 26, a steering torque observation unit 27, a reset unit 29, a command current value preparation unit 31, a current deviation calculation unit 32, a PI control unit 33, a γδ/UVW conversion unit 34, a PWM (Pulse Width Modulation) control unit 35, and a UVW/γδ conversion unit 36, The torque deviation calculation unit 22 and the PI control unit 23 are an example of an addition angle calculation unit. The command current value preparation unit 31, the current deviation calculation unit 32, the PI control unit 33, a γδ/UVW conversion unit 34, the PWM control unit 35, and the UVW/γδ conversion unit 36 are an example of a current drive unit.

Figure 4:
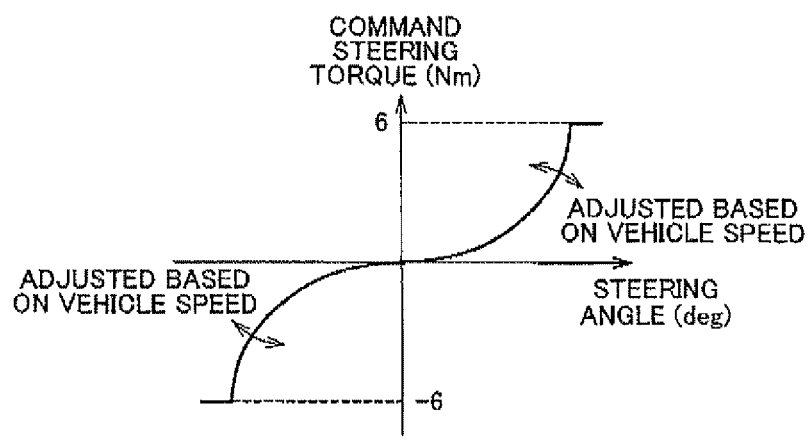
FIG. 4 is a graph showing an example of the characteristic of a command steering torque with respect to a steering angle.

The command steering torque setting unit 21 sets the command steering torque T* based on the steering angle detected by the steering angle sensor 4 and the vehicle speed detected by the vehicle speed sensor 6. For example, the command steering torque T* when the steering angle is a positive value (when the steering wheel 10 is operated clockwise) is set to a positive value (torque applied in the clockwise direction), and the command steering torque T* when the steering angle is a negative value (when the steering wheel 10 is operated counterclockwise) is set to a negative value (torque applied in the counterclockwise direction), based on the characteristic shown in FIG. 4. The command steering torque T* is set in such a manner that the absolute value of the command steering torque T* increases (nonlinearly increases, in the example in FIG. 4) as the absolute value of the steering angle increases. However, the command steering torque T* is set to a value within a range between a predetermined upper limit (positive value (e.g. +6 Nm)) and a predetermined lower limit (negative value (e.g. −6 Nm)). In addition, the command steering torque T* is set in such a manner that the absolute value of the command steering torque T* decreases as the vehicle speed increases. That is, a vehicle speed-sensitive control is executed.

Figure 5:
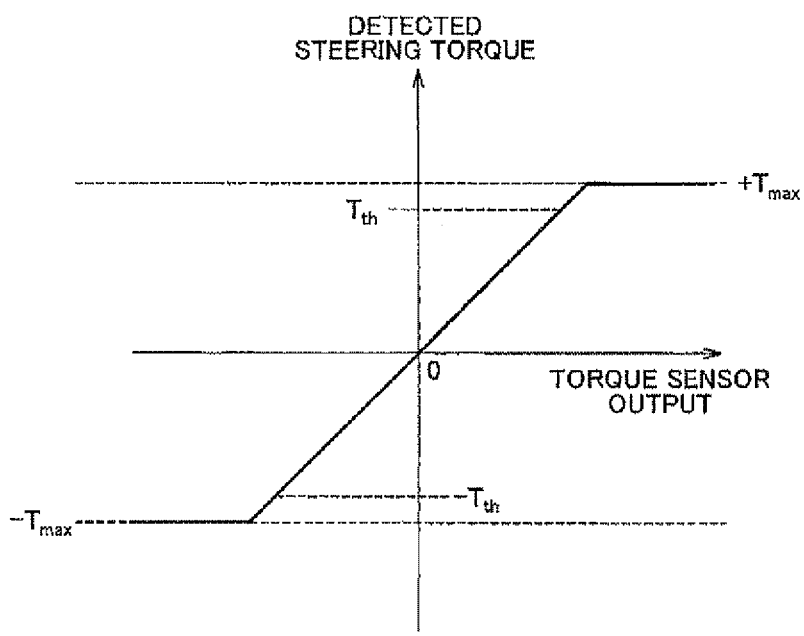
FIG. 5 is a graph showing a function of a steering torque limiter.

The steering torque limiter 20 limits the output from the torque sensor 1 between a predetermined upper saturation value +Tmax (+Tmax>0 (e.g. +Tmax=7 Nm)) and a predetermined lower saturation value −Tmax (−Tmax<0 (e.g. −Tmax=−7 Nm)). Specifically, as shown in FIG. 5, when the output from the torque sensor 1 is between the upper saturation value +Tmax and the lower saturation value −Tmax, the steering torque limiter 20 outputs the detected steering torque T that is the output from the torque sensor 1 without the limitation. When the detected steering torque T is equal to or larger than the upper saturation value +Tmax, the steering torque limiter 20 outputs the upper saturation value +Tmax. When the detected steering torque T is equal to or smaller than the lower saturation value −Tmax, the steering torque limiter 20 outputs the lower saturation value −Tmax. The saturation values +Tmax and −Tmax define a stable range (reliable range) of the output signal from the torque sensor 1. That is, in the ranges where the output signal from the torque sensor 1 is larger than the upper saturation value +Tmax and is smaller than the lower saturation value −Tmax, the output signal from the torque sensor 1 is unstable. In other words, the saturation values +Tmax and −Tmax are determined based on the output characteristic of the torque sensor 1. The absolute value of the saturation value Tmax is a first value.

The torque deviation calculation unit 22 obtains the deviation (torque deviation) $\Delta T$ (=T*−T) of the steering torque T detected by the torque sensor 1 and then limited by the steering torque limiter 20 (hereinafter, may be referred to as "limited detected steering torque T" so as to be distinguished) from the command steering torque T* that is set by the command steering torque setting unit 21. The PI control unit 23 executes the PI calculation on the torque deviation $\Delta T$. That is, the torque deviation calculation unit 22 and the PI control unit 23 are an example of a torque feedback control unit that brings the limited detected steering torque T to the command steering torque T*. The PI control unit 23 calculates the addition angle $\alpha$ for the control angle $\theta C$ by executing the PI calculation on the torque deviation $\Delta T$. Therefore, the torque feedback control unit is an example of an addition angle calculation unit to control the addition angle $\alpha$.

The addition angle limiter 24 is an addition angle limiting unit that imposes limits on the addition angle $\alpha$ obtained by the PI control unit 23. More specifically, the addition angle limiter 24 limits the addition angle $\alpha$ to a value within a range between a predetermined upper limit UL (positive value) and a predetermined lower limit LL (negative value). Hereinafter, the addition angle $\alpha$ limited by the addition angle limiter 24 may be referred as "limited addition angle $\alpha$". The upper limit UL and the lower limit LL are determined based on a predetermined limited value $\omega max$ ($\omega max>0$ (e.g. $\omega max=45$ degrees)). The predetermined limited value $\omega max$ is determined based on, for example, the maximum steering angular speed. The maximum steering angular speed is the maximum assumable value of the steering angular speed of the steering wheel 10, and, for example, approximately 800 deg/sec.

The rate of change in the electrical angle of the rotor 50 (angular speed in the electrical angle: maximum rotor angular speed) at the maximum steering angular speed is expressed by the product of the maximum steering angular speed, the speed reduction ratio of the speed reduction mechanism 7, and the number of pole pairs of the rotor 50, as indicated by Equation 2. The number of pole pairs is the number of magnetic pole pairs (pair of north pole and south pole) of the rotor 50.

Maximum rotor angular speed=maximum steering angular speed×speed reduction ratio×number of pole pairs    Equation 2

The maximum value of the amount of change in the electrical angle of the rotor 50 between the calculations (in the calculation cycle) of the control angle $\theta C$ is expressed by the value obtained by multiplying the maximum rotor angular speed by the calculation cycle, as indicated by Equation 3.

Maximum value of amount of change in rotor angle=maximum rotor angular speed×calculation cycle=maximum steering angular speed×speed reduction ratio×number of pole pairs×calculation cycle    Equation 3

This maximum value of the amount of change in the rotor angle is the maximum amount of change in the control angle $\theta C$ that is permitted within one calculation cycle. Therefore, the maximum value of the amount of change in the rotor angle is expressed by the limited value $\omega max$ (>0). The upper limit UL and the lower limit LL for the addition angle $\alpha$ are expressed by Equation 4 and Equation 5 with the limited value $\omega max$, respectively.

$UL=+\omega max$    Equation 4

$LL=-\omega max$    Equation 5

The addition angle $\alpha$ is limited by the addition angle limiter 24 and is then added to the immediately preceding value $\theta C(n-1)$ ("n" is the number of the current calculation cycle) of the control angle $\theta C$ by an addition unit 26A of the control angle calculation unit 26 ("Z−1" in the drawing indicates the immediately preceding value indicated by a signal). Note that, the initial value of the control angle $\theta C$ is a predetermined value (e.g. zero).

The addition angle observation unit 25 compares the absolute value of the limited addition angle $\alpha$ with a predetermined threshold value $\alpha th$. When the absolute value of the limited addition angle $\alpha$ remains the threshold value $\alpha th$ or more for a predetermined calculation cycle, the addition angle observation unit 25 determines an anomalous occurrence and then informs the reset unit 29 of the anomalous occurrence. The threshold value $\alpha th$ may equal the predetermined limited value $\omega max$. In such condition, the predetermined calculation cycle may be equal to or longer than an assumable value of the maximum steering duration in the maximum steering angle speed. Therefore, the anomalous occurrence is determined, if the duration that the control angle $\theta C$ is limited by the addition angle limiter 24 is longer than the assumable time of the maximum steering duration in the maximum steering angle speed.

The control angle calculation unit 26 includes the addition unit 26A that adds the limited addition angle $\alpha$ provided from the addition angle limiter 24 to the immediately preceding value $\theta C(n-1)$ of the control angle $\theta C$. That is, the control angle calculation unit 26 calculates the control angle $\theta C$ in each predetermined calculation cycle. The control angle calculation unit 26 uses the control angle $\theta C$ in the immediately preceding calculation cycle as the immediately preceding value $\theta C(n-1)$, and obtains the current value $\theta C(n)$ that is the control angle $\theta C$ in the current calculation cycle based on the immediately preceding value $\theta C(n-1)$.

The steering torque observation unit 27 observes whether the limited detected steering torque T is the saturation value +Tmax or −Tmax, namely, in the saturation condition. If the limited detected steering torque T is in the saturation condition, the steering torque observation unit 27 informs the reset unit 29 of such thing as the anomalous occurrence of the control.

The steering torque limiter 20, for example, may inform the steering torque observation unit 27 of the output of the torque sensor 1 being equal to or larger than the saturation value +Tmax or equal to or smaller than −Tmax. Based on this information, the steering torque observation unit 27 may determine whether the detected steering torque T is in the saturation condition. That is, the steering torque observation unit 27 may determine whether the detected steering torque T is in the saturation condition based on the operating condition of the steering torque limiter 20. The steering torque observation unit 27 may observe the post- or pre-limited detected steering torque T by the torque limiter 20. Or, the steering torque observation unit 27 may compare the post- or pre-limited detected steering torque T with an upper recovery threshold value +Tth and a lower recovery threshold value −Tth. The upper recovery threshold value +Tth is a little smaller than the upper saturation value +Tmax and the lower recovery threshold value −Tth is a little larger than the lower saturation value −Tmax. In this case, when the detected steering torque T is equal to or larger than the upper recovery threshold value +Tth or is equal to or smaller than the lower recovery threshold value −Tth, the steering torque observation unit 27 determines that the detected steering torque T is in the saturation condition. The absolute value of the recovery threshold value Tth is a second value.

The reset unit 29 executes a reset operation in response to the information of the anomalous occurrence from the addition angle observation unit 25 or the steering torque observation unit 27. In the embodiment, the reset operation includes (a) resetting an integration value in the PI control unit 23 (resetting an integral term in the torque feedback control, setting the integral term to zero); (b) resetting the addition angle α calculated by the PI control unit 23 (setting the addition angle α to zero); (c) resetting the immediately preceding value (the control angle θC in the immediately preceding calculation cycle) in the control angle calculation unit 26 (setting the immediately preceding value to zero); and (d) resetting an integration value in the PI control unit 33 (resetting an integral term in the current feedback control, setting the integral term to zero). The operation (b), resetting the addition angle α, is provided by resetting a proportional term and the integral term in the PI control unit 23, and thus the operation (a), resetting the integral term in the PI control unit 23, is simultaneously provided. The reset unit 29 is an example of a changing unit. Parameters being reset by the operations (a) to (d) are parameters for controlling the electric motor 3.

The reset operation let the limited addition angle α escape from the condition continuously limited by the addition angle limiter 24 and let the control recover. Thus, the control angle θC is encouraged to converge on an optimum value.

It is the most preferable that the reset operation executes all operations (a) to (d). However it is preferable that the reset operation executes at least the operation (a) and optionally one or more operations among the operations (b) to (d). It is more preferable that the reset operation executes at least the operations (a) and (h) and optionally one or both operations among the operations (c) and (d). Further, it is more preferable that the reset operation executes at least the operations (a) to (c) and optionally the operation (d).

The command current value preparation unit 31 prepares, as command current values, values of electric currents that should be supplied to the coordinate axes (imaginary axes) of the γδ coordinate system, which is the imaginary rotating coordinate system that corresponds to the control angle θC that is a rotational angle used in the control. More specifically, the command current value preparation unit 31 prepares the γ-axis command current value Iγ* and the δ-axis command current value Iδ* (hereinafter, these values will be collectively referred to as "two-phase command current value Iγδ*" where appropriate). The command current value preparation unit 31 sets the γ-axis command current value Iγ* to a significant value, and sets the δ-axis command current value Iδ* to 0. More specifically, the command current value preparation unit 31 sets the γ-axis command current value Iγ* based on the limited detected steering torque T that is detected by the torque sensor 1 and is then limited by the steering torque limiter 20.

Figure 6:
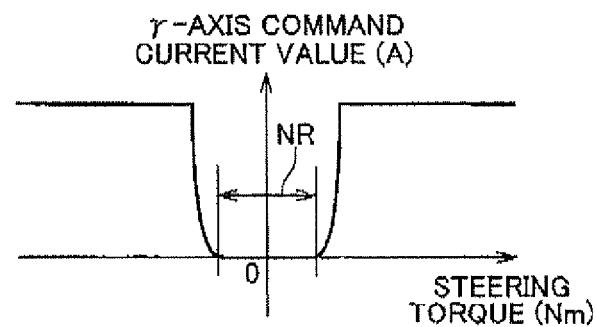
FIG. 6 is a graph showing an example of a manner for setting the γ-axis command current value with respect to a detected steering torque.

FIG. 6 shows an example of a manner of setting the γ-axis command current value Iγ* with respect to the limited detected steering torque T. The dead band NR is set in a region near the point at which the limited detected steering torque T is 0. The γ-axis command current value Iγ* rises sharply in the region outside the dead band NR, and is maintained substantially constant in the region where the torque is at or higher than a predetermined value. Thus, when the driver does not operate the steering wheel 10, electric power supply to the motor 3 is stopped to suppress unnecessary electric power consumption.

The current deviation calculation unit 32 calculates the deviation Iγ*−Iγ of the γ-axis detected current Iγ from the γ-axis command current value Iγ* prepared by the command current value preparation unit 31 and the deviation Iδ*−Iδ of the δ-axis detected current Iδ from the δ-axis command current value Iδ*(=0) prepared by the command current value preparation unit 31. The γ-axis detected current Iγ and the δ-axis detected current Iδ are provided from the UVW/γδ conversion unit 36 to the deviation calculation unit 32.

The UVW/γδ conversion unit 36 converts the three-phase detected current IUVW in the UVW coordinate system detected by the current detection unit 13 (the U-phase detected current IU, the V-phase detected current IV, and the W-phase detected current IW) to the two-phase detected currents Iγ and Iδ in the γδ coordinate system (hereinafter, collectively referred to as "two-phase detected current Iγδ" where appropriate). The two-phase detected currents Iγ and Iδ are provided to the current deviation calculation unit 32. The control angle θC calculated by the control angle calculation unit 26 is used in the coordinate conversion made by the UVW/γδ conversion unit 36.

The PI control unit 33 executes the PI calculation on the current deviation calculated by the current deviation calculation unit 32 to prepare the two-phase command voltage Vγδ* (the γ-axis command voltage Vγ* and the δ-axis command voltage Vδ*) that should be applied to the motor 3. The two-phase command voltage Vγδ* is provided to the γδ/UVW conversion unit 34.

The γδ/UVW conversion unit 34 executes the coordinate conversion calculation on the two-phase command voltage Vγδ* to prepare the thee-phase command voltage VUVW*. The three-phase command voltage VUVW* is formed of the U-phase command voltage VU*, the V-phase command voltage VV* and the W-phase command voltage VW*. The three-phase command voltage VUVW* is provided to the PWM control unit 35. The control angle θC calculated by the control angle calculation unit 26 is used in the coordinate conversion made by the γδ/UVW conversion unit 34.

The PWM control unit 35 prepares the U-phase PWM control signal, the V-phase PWM control signal and the W-phase PWM control signal having duty ratios that correspond to the U-phase command voltage VU*, the V-phase command voltage VV* and the W-phase command voltage VW*, respectively, and provides the control signals to the drive circuit 12.

The drive circuit 12 is formed of an inverter circuit having three phases that correspond to the U-phase, the V-phase and the W-phase. The power elements that comprise the inverter circuit are controlled based on the PWM control signals provided from the PWM control unit 35, and therefore the voltages that correspond to the three-phase command voltage VUVW* are applied to the U-phase stator coil 51, the V-phase stator coil 52 and the W-phase stator coil 53 of the motor 3.

The current deviation calculation unit 32 and the PI control unit 33 are an example of a current feedback control unit. The current feedback control unit controls the electric current that is supplied to the motor 3 in such a manner that the electric current that is supplied to the motor 3 approaches the two-phase command current value Iγδ* that is set by the command current value preparation unit 31.

Figure 3:
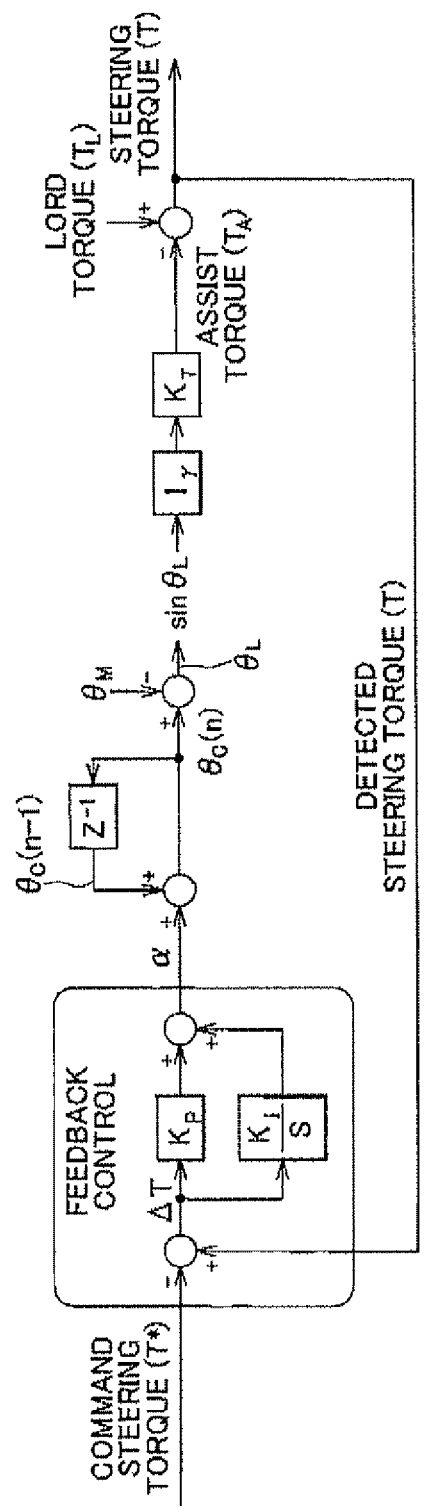
FIG. 3 is a control block diagram of the electric power steering apparatus.

FIG. 3 is a control block diagram of the electric power steering apparatus. Note that the function of the steering torque limiter 20 and the addition angle limiter 24 is omitted to simplify the explanation.

Through the PI control (KP is a proportionality coefficient, KI is an integration coefficient, and 1/s is an integration operator) on the deviation (torque deviation) ΔT of the detected steering torque T from the command steering torque T*, the addition angle α is prepared. The current value θC(n) =θC(n−1)+α of the control angle θC is obtained by adding the addition angle α to the immediately preceding value θC(n−1) of the control angle θC. At this time, the deviation of the actual rotor angle θM of the rotor 50 from the control angle θC is used as the load angle θL=θC−θM.

Therefore, if the γ-axis current Iγ is supplied to the γ-axis (imaginary axis) in the γδ coordinate system (imaginary rotating coordinate system), which rotates in accordance with the control angle θC, based on the γ-axis command current value Iγ*, the q-axis current Iq is equal to IγsinθL (Iq=IγsinθL). The q-axis current Iq contributes to generation of torque by the rotor 50. That is, the value obtained by multiplying the q-axis current Iq (=IγsinθL) by the torque constant KT of the motor 3 is transmitted to the steering mechanism 2 via the speed reduction mechanism 7 as the assist torque TA (=KT× IγsinθL). The value obtained by subtracting the assist torque TA from the load torque TL from the steering mechanism 2 is the steering torque T that should be applied by the driver to the steering wheel 10. When the steering torque T is fed back, a system is operated in such a manner that the steering torque T is brought to the command steering torque T*. That is, the addition angle α is obtained and the control angle θC is controlled based on the addition angle α so that the detected steering torque T coincides with the command steering torque T*.

The control angle θC is updated with the use of the addition angle α that is obtained based on the deviation ΔT of the detected steering torque T from the command steering torque T* while an electric current is supplied to the γ-axis that is the imaginary axis used in the control. Thus, the load angle θL changes and therefore, the torque that corresponds to the load angle θL is generated by the motor 3. Therefore, the torque that corresponds to the command steering torque T* set based on the steering angle and the vehicle speed is generated by the motor 3. Therefore, an appropriate steering assist force that corresponds to the steering angle and the vehicle speed is applied to the steering mechanism 2. That is, the steering assist control is executed in such a manner that the steering torque increases as the absolute value of the steering angle increases and the steering torque decreases as the vehicle speed increases.

Therefore, there is provided the electric power steering apparatus in which an appropriate steering assist operation is executed by appropriately controlling the motor 3 without using a rotational angle sensor. Thus, the configuration is simplified and cost is reduced.

Figure 7:
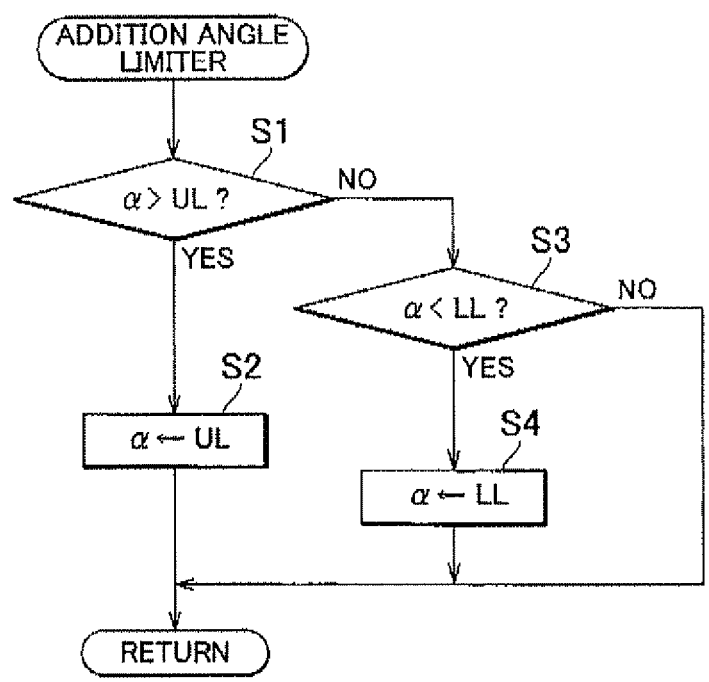
FIG. 7 is a flowchart illustrating the routine executed by an addition angle limiter.

FIG. 7 is a flowchart illustrating the routine executed by the addition angle limiter 24. The addition angle α obtained by the PI control unit 23 is compared with the upper limit UL (step (hereinafter, referred to as "S") 1). When the addition angle α is larger than the upper limit UL ("YES" in S1), the upper limit UL (=+ωmax) is substituted into the addition angle α (S2). Thus, the upper limit UL is added on the control angle θC.

When the addition angle α obtained by the PI control unit 23 is the upper limit UL or less ("NO" in S1), the addition angle limiter 24 further compares the addition angle α with the lower limit LL (S3). When the addition angle α is smaller than the lower limit LL ("YES" in S3), the lower limit LL (=−ωmax) is substituted into the addition angle α (S4). Thus, the lower limit LL is added on the control angle θC.

When the addition angle α obtained by the PI control unit 23 is the lower limit LL or more and is the upper limit UL or less ("NO" in S3), the actual addition angle α is added on the control angle θC.

Therefore, the addition angle limiter 24 limits the addition angle α between the upper limit UL and the lower limit LL so as to stabilize the control. More specifically, although the control condition is unstable (assist force is unstable) when the electric current is small or when the control starts, the addition angle limiter 24 encourages the control to move to the stable condition.

Figure 8:
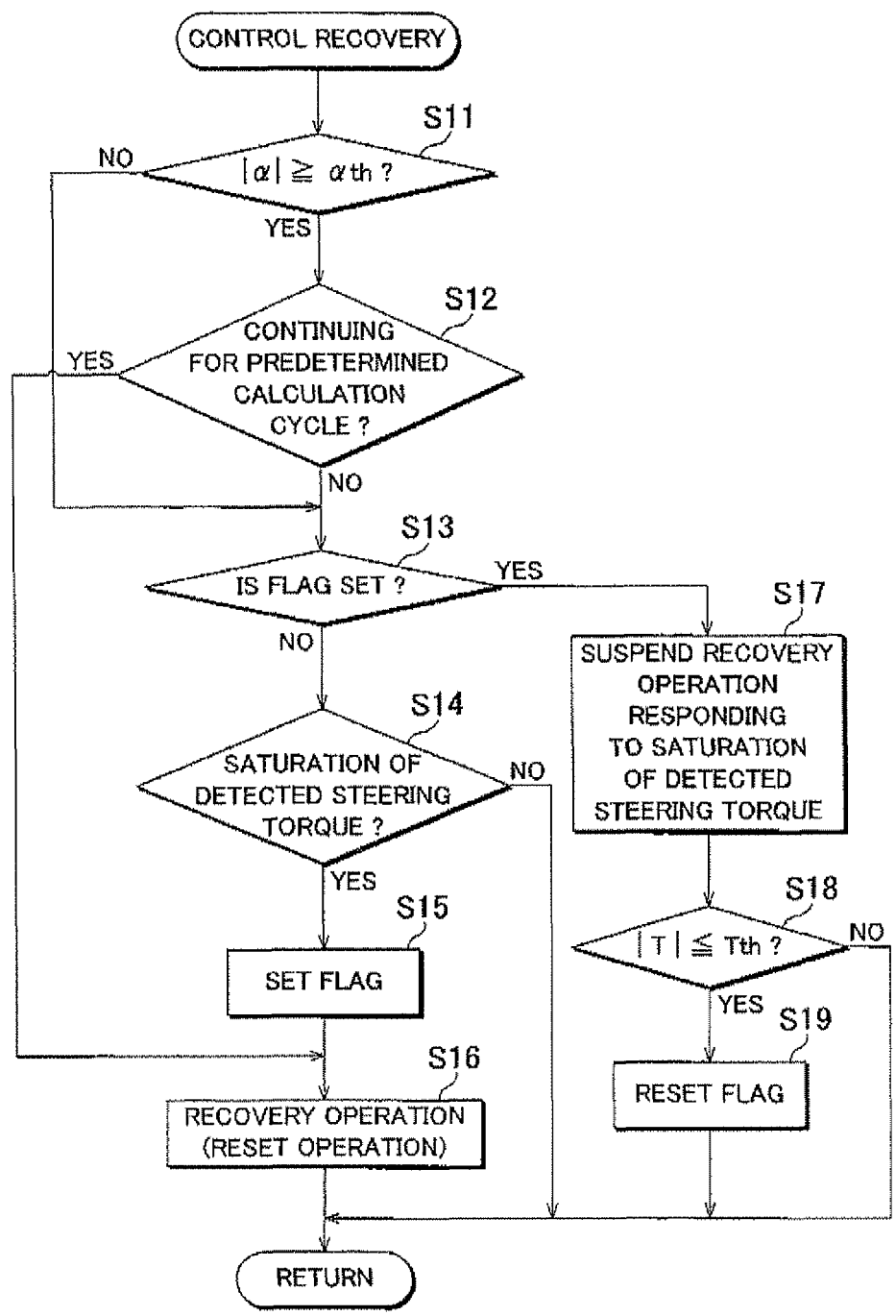
FIG. 8 is a flowchart illustrating the routine executed by an addition angle observation unit, a steering torque observation unit and a reset unit.

FIG. 8 is a flowchart illustrating the routine executed by the addition angle observation unit 25, the steering torque observation unit 27 and the reset unit 29. The addition angle observation unit 25 compares the absolute value |α| of the limited addition angle α with the threshold value αth (S 11). When the absolute value |α| of the limited addition angle α is the threshold value αth or more ("YES" in S11), the addition angle observation unit 25 further determines whether the condition of |α|≥αth continues for the predetermined calculation cycle (S12), In the case of "YES" in 512, the addition angle observation unit 25 determines the anomalous occurrence and informs the reset unit 29 of the anomalous occurrence. Receiving the information, the reset unit 29 executes the above described reset operation (recovery operation from the anomalous occurrence) (S16). In the case of "NO" in S11 or S12, the process moves to S13. S11, S12 and the addition angle observation unit 25 are a permission unit.

It is preferable that the threshold value αth is the predetermined limited value ωmax or less, for example, equal to the limited value ωmax.

Where the absolute value |α| of the limited addition angle α continues to be the threshold value αth or more, the addition angle α continues to be limited by the addition angle limiter 24. In this case, because the limited value ωmax is added on the control angle θC every calculation cycle, the amount of change of the control angle θC is large. Further, because the control angle θC changes by the limited value ωmax (constant value) every calculation cycle, the control angle θC takes finite number of values cyclically. If the limited value ωmax is a divisor of 360 degrees (e.g. 45 degrees), the control angle θC takes small finite number of values cyclically. In this case, the control angle θC may not take the optimum value that the detected steering torque T is brought to the command steering torque T*. That is, the control angle θC may skip the optimum value so as to continue to fluctuate.

In the embodiment, the absolute value |α| of the limited addition angle α continues to be the threshold value αth or more, the reset operation is executed because of determining the anomalous occurrence as explained above. Because the reset operation is executed, the addition angle α escapes from the condition limited by the addition angle limiter 24. Thus, the control recovers and encourages the control angle θC to converge on the optimum value. In such a manner, the steering assist force escapes from the unstable condition so that the steering feeling is improved.

On the other hand, in the case of "NO" in S11 or S12, a flag is checked (S13). The flag expresses whether the process is on the recovery operation that is started in response to the saturation of the limited detected steering torque T. The flag is set during the recovery operation and is reset when the process is not on the recovery process. When the flag is not set, it is determined whether the steering torque observation unit 27 detects the saturation of the limited detected steering torque T (S14). In the case of the saturation of the limited detected steering torque T ("YES" in S14), the steering torque observation unit 27 sets the flag (S15) and informs the reset unit 29 of the anomalous occurrence. Receiving the information, the reset unit 29 executes the above described reset operation (recovery operation from the anomalous occurrence) (S16). Then, the process advances to the recovery operation of the reset operation executed in accordance with the saturation of the limited detected steering torque T.

Because of the responsiveness of the torque sensor 1, although the reset operation is executed, the limited detected steering torque T may not immediately escape from the saturation. In such a manner, the limited detected steering torque T may not immediately converge on the command steering torque T*. Therefore, the recovery process needs a certain time.

In S13, the flag is set so that it is determined that the recovery operation is running ("YES" in S13), the steering torque observation unit 27 suspends the reset operation (recovery operation) by the reset unit 29 (S17). The steering torque observation unit 27 compares the absolute value |T| of the detected steering torque with the recovery threshold value Tth (Tth>0, for example, Tth=6.5 Nm. See FIG. 5) smaller than the saturation value Tmax (S18). If the absolute value of the detected steering torque T is the recovery threshold value Tth or less ("YES" in S18), the steering torque observation unit 27 resets the flag (S19). The steering torque observation unit 27 and S17 are an example of a suspending unit.

As a result of the recovery operation (reset operation) from the anomalous occurrence executed in accordance with the saturation of the limited detected steering torque T, until the absolute value |T| of the detected steering torque becomes the threshold value Tth or less so that the flag is reset (S13 and S19), the reset operation is suspended (S17). Therefore, the reset operation is prevented from repeated execution due to the responsiveness of the torque sensor 1, so that the control angle θC immediately converges on the optimum value. That is, there is a decrease in a delay of convergence of the control angle θC based on repeatedly resetting the calculation of the addition angle. Thus, an appropriate assist torque is immediately generated, so that the steering operation is inhibited or prevented from being heavy (surging the steering torque). Therefore, the steering feeling is improved.

Figure 9:
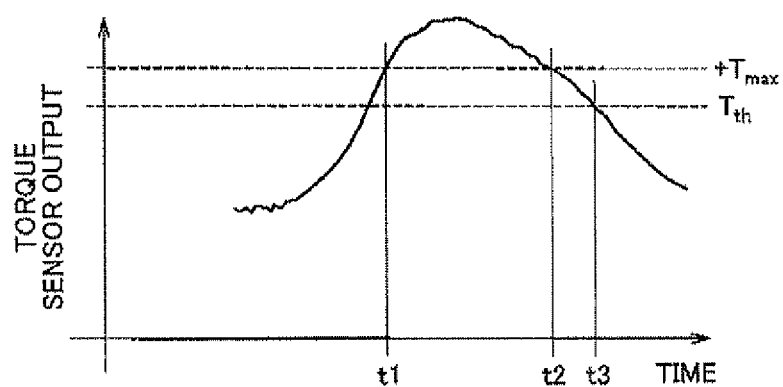
FIG. 9 is a graph showing an example of a time variation of an output value from a torque sensor.

FIG. 9 is a graph showing an example of a time variation of the output value from the torque sensor 1. That is, FIG. 9 shows the detected steering torque T before the limitation by the steering torque limiter 20. At the time t1 when the output value from the torque sensor 1 reaches the upper saturation value +Tmax, the reset operation is executed, for example, the addition angle α is reset to zero. However, in accordance with the reset operation, the output value from the torque sensor 1 does not become smaller than the upper saturation value +Tmax immediately. Namely, the output value from the torque sensor 1 reduces with spending a certain time, then becomes smaller than the upper saturation value +Tmax at the time t2, and subsequently becomes smaller than the recovery threshold value Tth at the time t3. If there is no suspension of the reset operation executed based on the saturation of the limited detected steering torque T, the reset operation is repeatedly executed during the time t1 to t2. Thus, the required assist torque is not obtained. On the other hand, in the embodiment, there is suspension of the reset operation executed based on the saturation of the limited detected steering torque T during the time t1 to t3. Such suspension prevents and inhibits the control from the repeated reset operation caused by the responsiveness of the torque sensor 1. Therefore, the control angle θC immediately converges on the optimum value so that the required assist torque is obtained. In such a manner, the steering feeling is improved.

Figure 10:
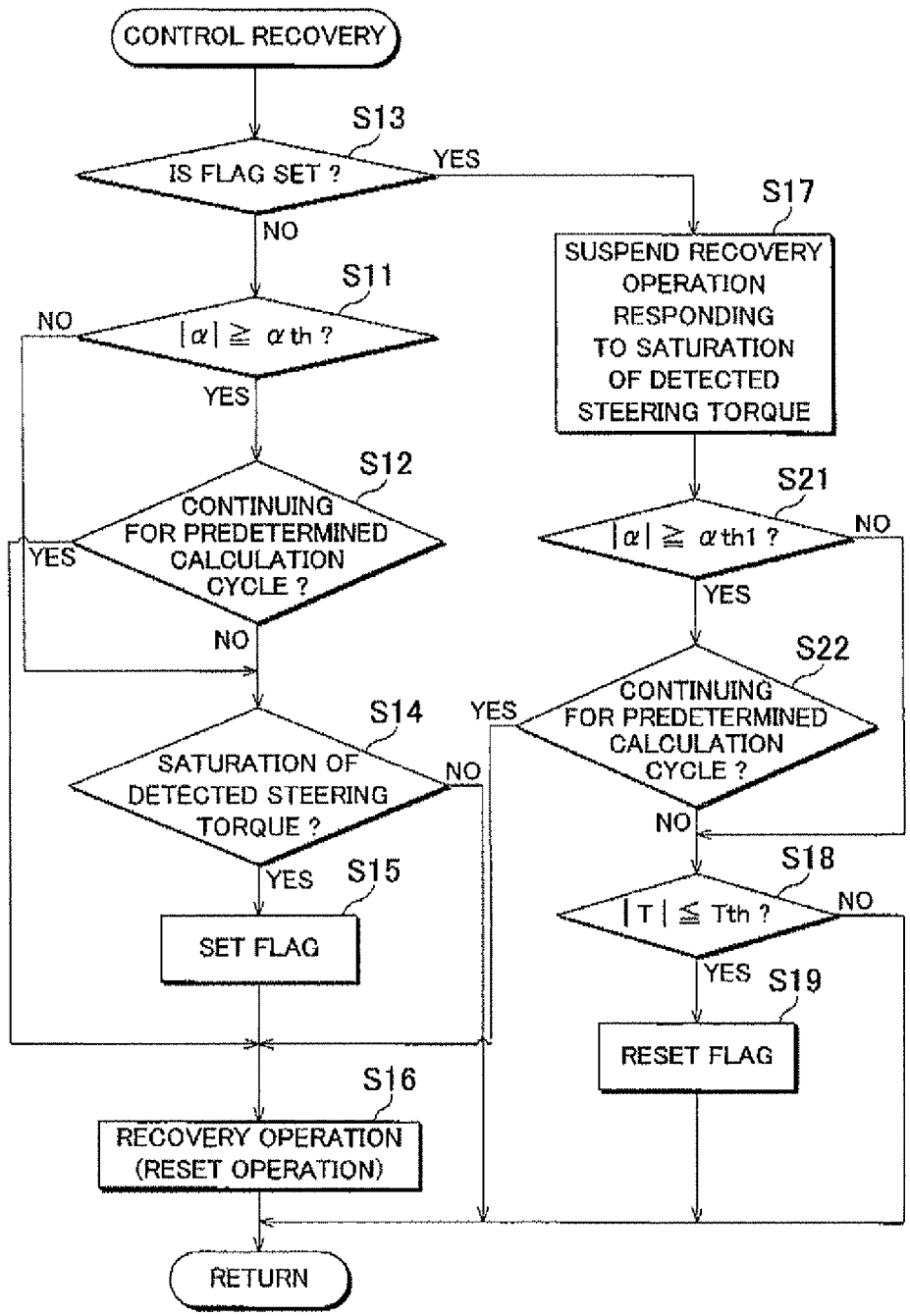
FIG. 10 is a flowchart illustrating the routine according to a second embodiment of the invention.

FIG. 10 is a flowchart illustrating the routine according to a second embodiment of the invention and is an applicable routine instead of the above-described one shown in FIG. 8. In FIG. 10, the same reference numerals are assigned to respective steps corresponding to the steps shown in FIG. 8. The second embodiment will be described with reference to FIG. 1 again.

In the second embodiment, when the recovery operation is executed in response to the saturation of the limited detected steering torque T, the threshold value compared with the absolute value of the limited addition angle α is changed from the threshold value (first threshold value, e.g. 45 degrees) αth to a second threshold value αth1 (e.g. 15 degrees). The second threshold value αth1 is smaller than the first threshold value αth.

More specifically, when the foregoing flag is set ("YES" in S13), the reset operation (recovery operation) is suspended in accordance with the saturation of the limited detected steering torque T (S17). The addition angle observation unit 25 compares the absolute value |α| of the limited addition angle α with the second threshold value αth1 (S21). If the absolute value |α| is the second threshold value αth1 or more ("YES" in S21), the addition angle observation unit 25 further determines whether the condition of |α|≥αth1 continues for the predetermined calculation cycle (S22). In the case of affirmation ("YES" in S22), the addition angle observation unit 25 determines the anomalous occurrence and informs the reset unit 29 of the anomalous occurrence. Receiving the information, the reset unit 29 executes the above described reset operation (recovery operation from the control abnormality) (S16). In the case of negation in S21 or S22, the process moves to S18.

If the flag is reset ("NO" in S13), the same processes as the first embodiment are executed. If the limited addition angle α is abnormal (if the absolute value |α| is the first threshold value αth or more and such condition continues for the predetermined calculation cycle) ("YES" in S11 and S12), or if the limited detected steering torque T is saturated ("YES" in S14), the reset operation is executed (S16). S11, S12, S21, S22 and the addition angle observation unit 25 are the permission unit.

Figure 11:
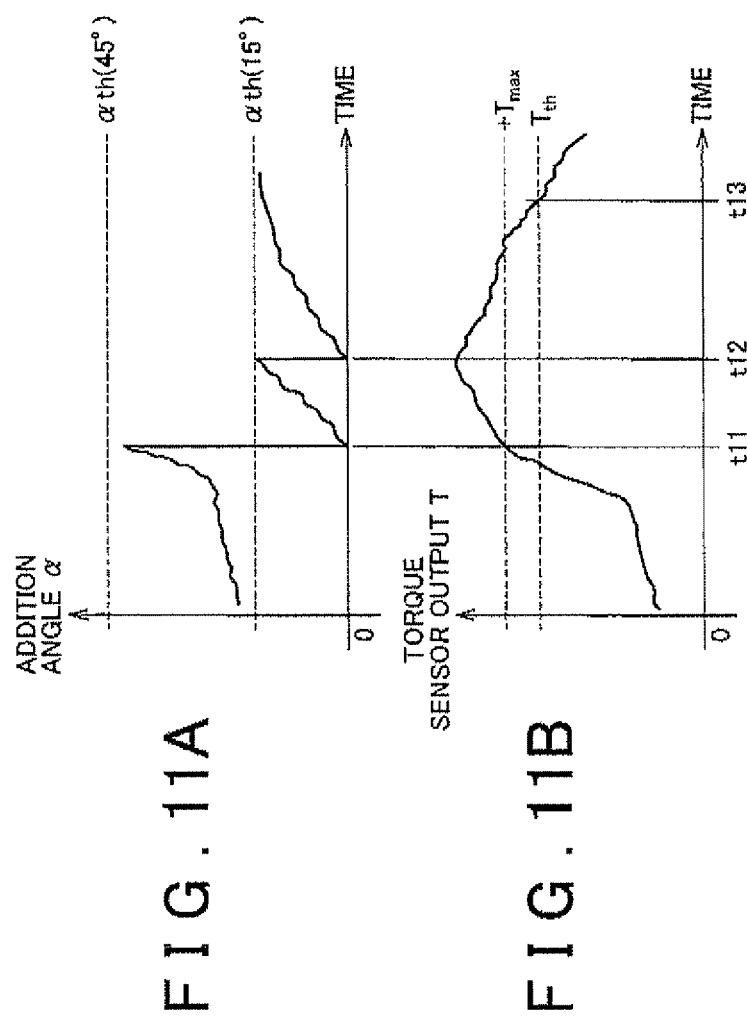
FIGS. 11A and 11B are graphs showing an example of a time variation of the addition angle and output value from the torque sensor of the second embodiment.

FIGS. 11A and 11B are explanatory drawings of the second embodiment whose graphs show an example of a time variation. FIG. 11A shows the time variation of the limited addition angle α. FIG. 11B shows the time variation of the detected steering torque T before the limitation of the steering torque limiter 20 (output from the torque sensor 1).

When the output from the torque sensor 1 increases, large assist torque is needed so that the addition angle α is also increases. If the output from the torque sensor 1 exceeds saturation value +Tmax so that the limited detected steering torque T is saturated at the time t11 before the limited addition angle α becomes the first threshold value αth, the reset unit 29 sets the limited addition angle α to zero. However, as described hereinbefore, it takes time that the output from the torque sensor 1 responses to the reset operation. Meanwhile, although the reset operation is suspended in accordance with the saturation of the limited detected steering torque T, the limited addition angle α may increase rapidly so that the control may be abnormal.

In the second embodiment, at the time t12 when the limited addition angle a becomes the second threshold value αth1 smaller than the first threshold value αth, the reset operation is executed. In such a manner, until the output from the torque sensor 1 decreases to the recovery threshold value Tth at the time t13, the absolute value |α| of the limited addition angle α is prevented from taking excessive value (first threshold value αth, for example, αth=ωmax in this embodiment) so that the control does not go into abnormality. Therefore, the limited addition angle α is inhibited or prevented from repeating sudden change between zero and the upper limit (UL=+ωmax) or the lower limit (LL=−ωmax). The control angle θC immediately converges on the optimum value. The steering operation is inhibited or prevented from being heavy (surging the steering torque).

Figure 12:
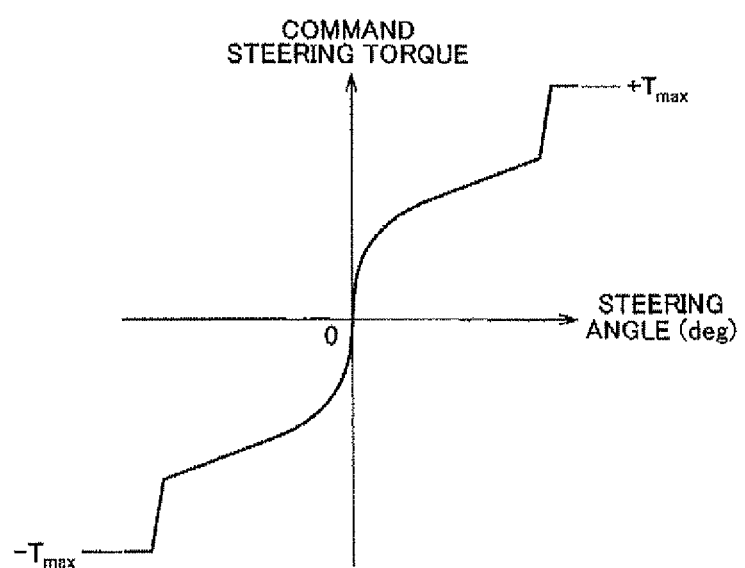
FIG. 12 is a graph showing another example of the characteristic of the command steering torque with respect to the steering angle.

Hereinbefore, although two embodiments of the invention were described, the invention can be applied to other embodiments. For example, the command steering torque setting unit 21 may set the command steering torque based on the characteristic as shown in FIG. 12. That is, in this characteristic, the absolute value of the command steering torque T* increases rapidly close to the both ends of the steering angle range. More specifically, close to the both ends of the steering angle range, the absolute value of the command steering torque T* is set to the saturation value Tmax of the limited detected steering torque T. Thus, close to the both ends of the steering angle range, the torque deviation ΔT becomes zero and accordingly the addition angle α becomes zero. Therefore, the electric motor 3 does not generate the torque so that the steering operation is substantially prevented from exceeding the steering angle range. Note that, the above "steering angle range" is narrower than the mechanical operation angle of the steering wheel 10. More specifically, the steering angle range is set based on the upper limit and lower limit of the steering angle where the control abnormality may occur because of lack of electric current.

The larger absolute value of the steering angle, the larger load torque. Accordingly, larger assist torque is needed. However, the motor 3 generates torque that has an upper limit value based on the γ-axis command current value Iγ* so as not to generate torque larger than the upper limit value. If the command steering torque T* is set to more than the upper limit value of the motor torque, the limited detected steering torque T may saturate and the torque deviation ΔT may be too large so that the absolute value of the addition angle α may reach the limited value ωmax. Thus, the control abnormality may occur so as to impair the steering feeling.

In the case of the characteristic of the command steering torque as shown in FIG. 12, the electric motor controller is able to confine the steering angle range to the range where the electric current is insufficient. In such a manner, imaginary steering ends can be constructed at both ends of the steering angle range. Therefore, the control is inhibited or prevented from the abnormality caused by lack of the electric current so that the steering feeling is improved.

In the above described embodiments, as examples of changing the parameter(s) to control the motor 3, at least one of the reset operations (a) to (d) ((a) resetting the integration value in the PT control unit 23, (b) resetting the addition angle α, (c) resetting the immediately preceding value of the control angle θC and (d) resetting the integration value in the PI control unit 33) is executed. However, changing the parameters to control the motor 3 is not limited to the reset operations (a) to (d). As for changing the parameters, the motor controller may execute, for example, changing the gains in the PI control units 23 and 33, changing (reducing) the limited value ωmax in the addition angle limiter 24, changing the γ-axis command current value Iγ*, and/or modifying the control angle θC (e.g. shifting a predetermined value).

Further, in the above described embodiments, the addition angle observation unit 25 observes whether the absolute value of the limited addition angle α continues to take the threshold value αth or more. However, the addition angle observation unit 25 may observe a duration that the addition angle limiter 24 continues to limit the addition angle α.

Furthermore, in the above described embodiments, the configuration in which a rotational angle sensor is not provided and the motor 3 is driven by executing the sensorless control has been described. Alternatively, the configuration in which a rotational angle sensor, for example, a resolver is provided and the above-described sensorless control is executed when the rotational angle sensor malfunctions may be employed. Thus, even if the rotational angle sensor malfunctions, the motor 3 is continuously driven. Therefore, the steering assist operation is continuously executed.

In this case, when the rotational angle sensor is used, the δ-axis command current value Iδ* is generated by the command current value preparation unit 31 based on the steering torque and the vehicle speed according to the predetermined assist characteristic.

In the above described embodiments, the electric motor controller comprises the current drive unit 31 to 36, the control angle calculation unit 26, the torque detection unit 1, the command steering torque setting unit 21 and the addition angle calculation unit 22 and 23. The current drive unit 31 to 36 drives the electric motor 3 based on the axis current value (imaginary axis current value) Iγ* in the rotating coordinate system (γδ coordinate system: imaginary rotating coordinate system) that rotates in accordance with the control angle θC that is the rotational angle used in the control. The control angle calculation unit 26 obtains the current value θC(n) of the control angle θC by adding the addition angle α to the immediately preceding value θC(n−1) of the control angle θC in each predetermined calculation cycle. The torque detection unit 1 detects the steering torque T. The command steering torque setting unit 21 sets the command steering torque T* based on the predetermined characteristic. The addition angle calculation unit 22 and 23 calculates the addition angle α based on the deviation ΔT of the detected steering torque T from the command steering torque T*.

According to the embodiments, the electric motor 3 is driven based on the axis current value (imaginary axis current value) Iγ* in the imaginary rotating coordinate system (γδ coordinate system) that rotates in accordance with the control angle θC. Besides, the control angle θC is updated by adding the addition angle α to the immediately preceding value θC(n−1) in each predetermined calculation cycle. Therefore, with updating the control angle θC, namely, with updating the coordinate axis of the γδ coordinate system (imaginary axis), the motor 3 is driven based on the imaginary axis current value Iγ* so as to generate the required torque. In such a manner, without the rotational angle sensor, the motor 3 is able to generate the appropriate torque.

Further in the embodiments, the electric motor controller comprises the reset unit 29 and the suspending unit 27 and S17. The reset unit 29 resets at least one of the parameters (the integration value in the PI control unit 23, the addition angle α, the immediately preceding value θC(n−1) of the control angle θC and the integration value in the PI control unit 33) to control the motor 3, when the absolute value of the detected steering torque T is equal to or larger than the first value Tmax. The suspending unit 27 and S17 suspends the reset operation in the reset unit 29, until the absolute value of the detected steering torque T becomes equal to or smaller than the second value Tth. The second value Tth is equal to or smaller than the first value Tmax.

Therefore, when the control may be unstable because of the large detected steering torque T, the motor control is changed so as to be stable.

Even if the motor control is changed, it takes a certain time in response to decreasing the detected steering torque T. This is because of, for example, the responsiveness of the torque detection unit 1 and etc. Thus, until the detected steering torque T is decreased in accordance with changing the motor control, the detected steering torque T may satisfy the condition for changing the motor control.

In the embodiments, after changing the motor control in response to the detected steering torque T, the reset unit 29 does not change motor control until the absolute value of the detected steering torque T becomes equal to or smaller than the second value Tth. Therefore, during response lag of the detected steering torque T, the motor control is inhibited or prevented from being changed.

For example, it is preferable that the reset unit 29 changes the motor control in accordance with whether the detected steering torque T is saturated (whether the detected steering torque T is limited to the upper limit UL or lower limit LL by the steering torque limiter 20). The motor control, for example, is set to normal mode when the detected steering torque T is not saturated, and is set to the other mode when the detected steering torque T is saturated. In such a manner, when the detected steering torque T is saturated so that the motor control appears to be abnormal, the motor control is changed. As a result, the control is inhibited from abnormality and is encouraged to recover from abnormality rapidly.

The saturation of the detected steering torque T, in detail, is that the absolute value of the detected steering torque T becomes equal to or larger than the first value Tmax so as to be limited to the saturation value Tmax by the steering torque limiter 20. The saturation value Tmax may be determined based on the specification of the torque detection unit 1. That is, the saturation value Tmax may be determined based on the border of the reliable range of the output signal from the torque detection unit 1.

It is preferable that the suspending unit 27 and S17 suspends the reset operation in the reset unit 29 until the absolute value of the detected steering torque T becomes the second predetermined value Tth or less. The second predetermined value Tth is smaller than the saturation value Tmax. That is, the suspending unit 27 and S17 suspends the reset operation in the reset unit 29 until the absolute value of the detected steering torque T becomes enough small value. Therefore during response lag of the detected steering torque T, the motor control is inhibited or prevented from being changed.

The first and second embodiments further comprise the permission unit 25, S11 and S12. When the absolute value of the addition angle α is equal to or larger than the threshold value αth, the permission unit 25, S11 and S12 permits the reset operation in the reset unit 29 even during the suspending unit 27 and S17 suspends the reset operation.

The second embodiment further comprises the permission unit 25, S21 and S22. When the absolute value of the addition angle α becomes equal to or larger than the threshold value αth1 smaller than the limited value (upper limit UL and lower limit LL) limited by the addition angle limiter 24, the permission unit 25, S21 and S22 permits the reset operation in the reset unit 29 even during the suspending unit 27 and S17 suspends the reset operation.

According to the embodiments, the addition angle observer 25 observes the addition angle α. When the absolute value of the addition angle α is equal to or larger than the predetermined threshold value αth or αth1, the motor control is changed even when the suspending unit 27 and S17 suspends the reset operation. The larger absolute value of the addition angle α, the wider variation width of the control angle θC in the calculation cycle. In such case, the control angle θC may be hard to converge on the optimum value so that the motor control may be abnormal. For example, when the detected steering torque T is saturated and the motor 3 needs a large torque, the absolute value of the addition angle α becomes large so that the motor control may be abnormal. In this condition, the motor control is changed in accordance with the detected steering torque in order to recover from the abnormality. As described above, however, it takes a certain time that the detected steering torque T responds to changing the motor control. Therefore, observing the addition angle α, the embodiments change the motor control when the absolute value of the addition angle α is equal to or larger than the threshold values αth and αth1. Therefore, the motor control is prevented from being abnormal.

In the embodiments, because the addition angle limiter 24 appropriately limits the addition angle α, excessive absolute value of the addition angle α, in comparison with the actual rotation of the rotor 50, is never added to the control angle θC. Thus, the motor 3 is controlled appropriately. On the other hand, for example, after the reset unit 29 changes the motor control because of the saturation of the detected steering torque T, the suspending unit 27 and S17 may suspend changing the motor control. Even during the suspension, when the absolute value of the addition angle α reaches the threshold value αth1 smaller than the limited value (upper limit UL and lower limit LL), the motor control is changed. Therefore, during response lag of the detected steering torque T, the motor control is surely inhibited or prevented from being abnormal repeatedly.

The reset unit 29 is able to reset the addition angle calculation unit 22 and 23. Thus, the addition angle calculation unit 22 and 23 is reset based on the steering torque so that the stable control is provided. For example, when the detected steering torque T is saturated and the absolute value of the addition angle α becomes large, namely when the control abnormality is estimated, resetting the addition angle calculation unit 22 and 23 encourages the motor control to recover from the abnormality rapidly.

More specifically, the motor controller comprises the command torque setting unit 21 that sets the command torque T* to be applied to the motor driven member 2 except the motor torque. Further, the addition angle calculation unit 22 and 23 includes the feedback control units 22 and 23 that calculate the addition angle α in order to bring the detected torque T close to the command torque T*. The feedback control units 22 and 23 execute feedback control calculation including integral control (proportional-integral control, proportional-integral-derivative control and etc.). The reset unit 29 resets (sets to zero) the integral value. The reset unit 29 resets the addition angle α (sets to zero) in addition to the integral value. In detail, resetting (setting to zero) the proportional term and the integral term, the reset unit 29 is able to reset the addition angle α and the integral value.

The motor 3 applies torque to the steering mechanism 2 of the vehicle. The torque detection unit 1 detects the steering torque applied to the steering member 10 to steer the vehicle. The command steering torque setting unit 21 sets the command steering torque T* as the target value of the steering torque. The addition angle calculation unit 22 and 23 calculates the addition angle α based on the deviation ΔT of the detected steering torque T from the command steering torque T*.

That is, the command steering torque T* is set, and the addition angle α is calculated based on the deviation ΔT of the detected steering torque T from the command steering torque T*. Therefore, the addition angle α is determined, such that the steering torque becomes the command steering torque T*. Accordingly, the control angle θC is determined. Therefore, setting the command steering torque T* appropriately, the motor controller is able to control the motor 3 that generates appropriate torque to apply to the steering mechanism 2. That is, the load angle θL is led to the value corresponding to the command steering torque T*. The load angle θL is the deviation of the imaginary axis from the coordinate axis of the rotating coordinate system (dq coordinate system) that rotates in accordance with the magnetic pole direction of the rotor 50. As a result, the motor 3 generates appropriate torque so as to apply the torque corresponding to the steering intention of the driver to the steering mechanism 2.

The motor controller further comprises the steering angle detection unit 4 that detects the steering angle of the steering member 10. The command torque setting unit 21 sets the command steering torque T* based on the steering angle detected by the steering angle detection unit 4. Thus, the motor 3 generates appropriate torque in accordance with the steering angle so that the steering torque applied to the steering member 10 by the driver is led to the value corresponding to the steering angle. In such a manner, a good steering feeling is obtained.

The command steering torque setting unit 21 sets the command steering torque T* based on the vehicle speed detected by the speed detection unit 6, so that the motor is controlled in response to vehicle speed. As a result, a good steering feeling is obtained. For example, when the vehicle speed is high, the command steering torque T* is set to small value. In such a manner, a good steering feeling is obtained.

In the embodiments described above, the invention is applied to the electric power steering apparatus. Alternatively, the invention may be applied to a motor control for an electric pump hydraulic power steering apparatus. Further alternatively, the invention may be implemented in various embodiments other than a power steering apparatus. For example, the invention may be applied to a steer-by-wire (SBW) system, a variable gear ratio (VGR) steering system, and a control over a brushless motor provided in another vehicle steering apparatus. Of course, the motor controller according to the invention is applicable for the other use of the motor control, instead of the vehicle steering apparatus.

Further, various design changes may be made within the scope of the invention.

What is claimed is:

1. An electric motor controller for controlling an electric motor and that includes a rotor and a stator that faces the rotor, the electric motor controller comprising:
   a current drive unit that drives the electric motor based on an axis current value in a rotating coordinate system that rotates in accordance with a control angle that is a rotational angle used in a control and calculated without using a rotational angle sensor that detects a rotation angle of the rotor so that the control angle is determined independently from the rotation angle of the rotor;
   an addition angle calculation unit that calculates, without detecting a change of the rotation angle of the rotor, an addition angle that is added to the control angle;
   a control angle calculation unit that obtains a current value of the control angle by adding the addition angle to an immediately preceding value of the control angle in each predetermined calculation cycle;
   a torque detection unit that detects a torque applied to a motor driven member except a motor torque applied thereto by the electric motor;
   a changing unit that changes a parameter for controlling the electric motor in accordance with a detected torque that is detected by the torque detection unit;
   a suspending unit that suspends such operation of the changing unit until an absolute value of the detected torque becomes equal to or smaller than a predetermined value; and
   a command torque setting unit that sets a command torque based on a predetermined characteristic,
   wherein the addition angle calculation unit calculates the addition angle based on a proportional integral control to a deviation of the detected torque from the command torque without using a rotational angle sensor that detects a rotation angle of the rotor,
   wherein the changing unit changes the addition angle as the parameter to zero when the absolute value of the detected torque is equal to or smaller than the predetermined value, and
   wherein the changing unit changes the parameter when the absolute value of the detected torque is equal to or larger than a first value that is equal to or larger than the predetermined value.

2. The electric motor controller according to claim 1, wherein:
   the addition angle calculation unit executes a proportional integral control, and
   the changing unit changes the parameter in the proportional integral control to zero, the parameter in the proportional integral control being an integral term.

3. The electric motor controller according to claim 2, wherein the changing unit changes a proportional term and the integral term in the proportional integral control to zero so as to change the addition angle to zero.

4. The electric motor controller according to claim 2, wherein the changing unit changes the parameter to zero, the parameter being the immediately preceding value of the control angle.

5. The electric motor controller according to claim 4, further comprising:
   a proportional integral control unit for controlling the axis current value,
   wherein the changing unit changes the parameter in the proportional integral control unit to zero, the parameter in the proportional integral control unit being an integral term.

6. The electric motor controller according to claim 1, further comprising:
   a permission unit that permits the operation of the changing unit when an absolute value of the addition angle is equal to or larger than a threshold value.

7. The electric motor controller according to claim 6, further comprising:
   an addition angle limiter that limits the absolute value of the addition angle to a limited value that is equal to or larger than the threshold value.

8. An electric motor controller for a vehicle steering apparatus that includes an electric motor with a rotor and a stator that faces the rotor, and a steering mechanism to which the electric motor applies a motor torque, the electric motor controller comprising:
   a current drive unit that drives the electric motor based on an axis current value in a rotating coordinate system that rotates in accordance with a control angle that is a rotational angle used in a control and calculated without using a rotational angle sensor that detects a rotation angle of the motor so that the control angle is determined independently from the rotation angle of the rotor;

an addition angle calculation unit that calculates, without detecting a change of the rotation angle of the rotor, an addition angle that is added to the control angle;

a control angle calculation unit that obtains a current value of the control angle by adding the addition angle to an immediately preceding value of the control angle in each predetermined calculation cycle;

a torque detection unit that detects a steering torque applied to a steering member;

a changing unit that changes a parameter for controlling the electric motor in accordance with a detected steering torque that is detected by the torque detection unit;

a suspending unit that suspends such operation of the changing unit until an absolute value of the detected steering torque becomes equal to or smaller than a predetermined value; and a command steering torque setting unit that sets a command steering torque based on a predetermined characteristic, wherein the addition angle calculation unit calculates the addition angle based on a proportional integral control to a deviation of the detected steering torque from the command steering torque without using a rotational angle sensor that detects a rotation angle of the motor, wherein the changing unit changes the addition angle as the parameter to zero when the absolute value of the detected steering torque is equal to or smaller than the predetermined value, and wherein the changing unit changes the parameter when the absolute value of the detected torque is equal to or larger than a first value that is equal to or larger than the predetermined value.

9. The electric motor controller for the vehicle steering apparatus according to claim 8, wherein:

the addition angle calculation unit executes a proportional integral control, and the changing unit changes the parameter in the proportional integral control to zero, the parameter in the proportional integral control being an integral term.

10. The electric motor controller for the vehicle steering apparatus according to claim 9, wherein the changing unit changes a proportional term and the integral term in the proportional integral control to zero so as to change the addition angle to zero.

11. The electric motor controller for the vehicle steering apparatus according to claim 9, wherein the changing unit changes the parameter to zero, the parameter being the immediately preceding value of the control angle.

12. The electric motor controller for the vehicle steering apparatus according to claim 11, further comprising:

a proportional integral control unit for controlling the axis current value, wherein the changing unit changes the parameter in the proportional integral control unit to zero, the parameter in the proportional integral control being an integral term.

13. The electric motor controller for the vehicle steering apparatus according to claim 8, further comprising:

a permission unit that permits the operation of the changing unit when an absolute value of the addition angle is equal to or larger than a threshold value.

14. The electric motor controller for the vehicle steering apparatus according to claim 13, further comprising:

an addition angle limiter that limits the absolute value of the addition angle to a limited value that is equal to or larger than the threshold value.

* * * * *